United States Patent [19]

Belbel et al.

[11] Patent Number: 4,888,661

[45] Date of Patent: Dec. 19, 1989

[54] CIRCUIT AND APPARATUS FOR THE PROTECTED SUPPLY OF A LOAD BY MEANS OF STATIC AND ELECTROMECHANICAL SWITCHES

[75] Inventors: Elie Belbel, Epinay Sur Seine; Thierry Boucheron, Saint Germain En Laye; Michel Lauraire, Courbevoie; Jean-Paul Riotte, Epinay Sur Seine, all of France

[73] Assignee: La Telemecanique Electrique, France

[21] Appl. No.: 220,647

[22] Filed: Jul. 18, 1988

[30] Foreign Application Priority Data

Jul. 17, 1987 [FR] France ............................... 87.10112

[51] Int. Cl.[4] ............................................. H02H 3/00

[52] U.S. Cl. ........................................ 361/102; 361/98

[58] Field of Search .................. 361/93, 89, 100, 101, 361/102, 98

[56] References Cited

U.S. PATENT DOCUMENTS

| | | | |
|---|---|---|---|
| 3,611,043 | 10/1971 | Steen | 361/102 |
| 3,986,103 | 10/1976 | Frankenberg et al. | 361/102 |

*Primary Examiner*—Derek S. Jennings

*Attorney, Agent, or Firm*—William A. Drucker

[57] ABSTRACT

A circuit and apparatus are provided for the protected supply of a load using static and electromechanical switches. A switch apparatus having current limiting properties is opened by remote control means after a very short delay, following disabling of a static switch system placed in series therewith and connected in parallel across a voltage limiting component.

8 Claims, 3 Drawing Sheets

CIRCUIT AND APPARATUS FOR THE PROTECTED SUPPLY OF A LOAD BY MEANS OF STATIC AND ELECTROMECHANICAL SWITCHES

BACKGROUND OF THE INVENTION

The invention relates to a circuit, respectively an apparatus for supplying a load with protection against current surges by means of controlled semiconductors and electromechanical switches placed in series with this load, and in which signals resulting from the measurement of these currents are distributed in a particular order and with a particular delay not only to the control electrodes of the semiconductors but also to a means for electromechanically controlling these switches.

Protective apparatus of the thermal relay type are already known intended to be placed in a supply circuit in series with a static switch module and with a load such as a multiphase motor and in which current measurement means are associated both with electromechanical means for breaking the circuit and with an electronic device capable of emitting disabling signals intended for the static switch module.

Such a protected supply circuit may be reproached for only providing a relatively limited protection, because of the lack of speed accompanying its operation and because of the impossibility of providing an efficient protection of the semiconductors.

Such deficiencies are more particularly felt when it is a question of protecting lines against the appearance of very intense currents which can be observed in the case of short-circuits. However, such a circuit or apparatus has the advantage of providing galvanic isolation of the load, the utility of which is particularly felt when, under normal operating conditions, conduction is provided by semiconductors and the disabling of which or its immunity to parasites it is sometimes difficult to guarantee.

Furthermore, the semiconductors used for providing these functions are usually formed by thyristors or triacs which can only be disabled when the current passes through a substantially zero value, so that the appearance of a fault current at an unfavorable moment in the half period cannot be processed before 10 milliseconds.

Finally, the expensive semiconductors at present available for forming such circuits or the corresponding apparatus are not capable of withstanding overvoltages of about 1000 V without break-downs, which voltages commonly occur in industrial installations fed from networks whose voltage is from 380 V to 440 V and are further subject to their own voltage drops which require efficient and so cumbersome cooling, as soon as the nominal currents reach 50 A.

SUMMARY OF THE INVENTION

Consequently, the invention provides a circuit, respectively an apparatus, for the protected supply of a load and of the supply line whose general construction corresponds to that mentioned above so as to keep the advantages thereof, but in which measures will be taken for improving its performances, not only in so far as the speed of its response time is concerned, and so the ability to limit short-circuit currents, but also to reduce its technical cost through the use of low voltage static switches and also to improve its operating safety as well as the protection of the semiconductors against current overloads and excessive overvoltages.

In accordance with the invention, this object is attained because the electromechanical switch has current limiting properties which are used, should an overload appear, to cause breaking very rapidly following the emission of disabling signals applied to low voltage semiconductors capable of being disabled, such as IGBTs, each placed in parallel with a voltage limiting component, and so that this short delay causes breaking of the circuit before the current is cancelled out.

BRIEF DESCRIPTION OF THE DRAWINGS

Other features of the invention for establishing an adequate operating sequence, as well as measures taken for using for other purposes all or part of the electronic circuits associated with the static switches, will be better understood from the following description with reference to the accompanying figures which show.

DESCRIPTION OF THE PREFERRED EMBODIMENTS

Figure 1:
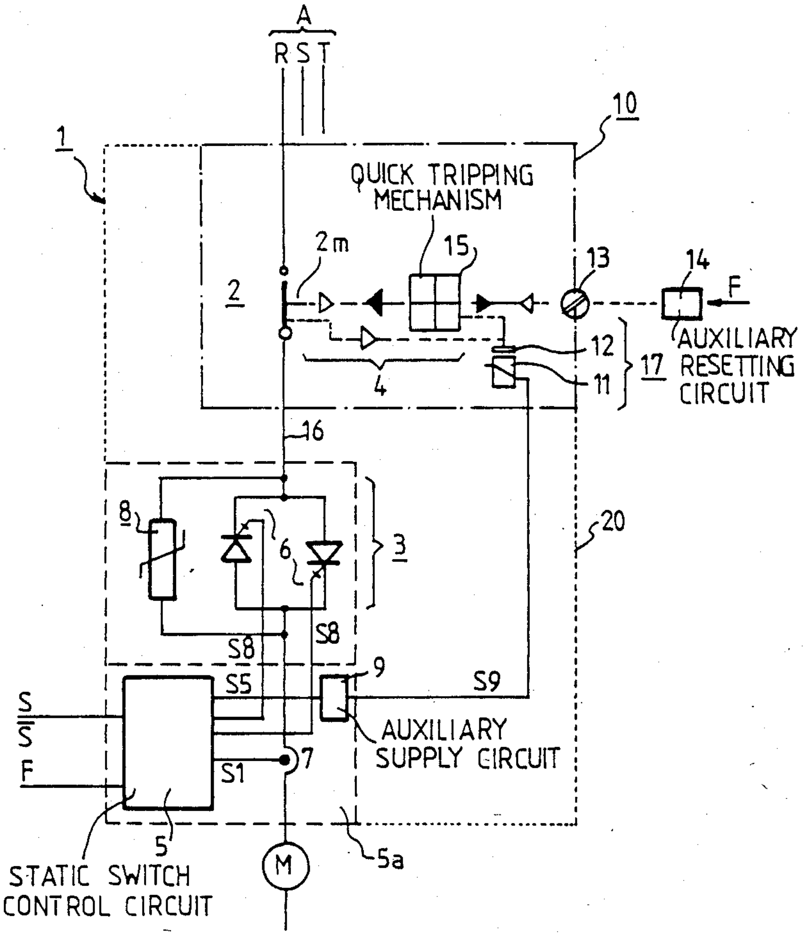
FIG. 1, a general diagram of the circuit and/or of the apparatus of the invention.

The general diagram shown in FIG. 1 shows a circuit 1 in which the letter R designates one of the conductors of a supply network A, which may be single or multiphase, and which is intended to supply a load such as a motor M.

Between the network and the motor two separate means 2, 3 are placed for each phase and in series, each fulfilling the function of current interruption and establishment, the first by means of an electromechanical switch device 4 and the second by means of a low voltage static switch device 3 comprising at least one disablable semiconductor component of IGBT type, such as one of those commonly designated GTO, IGT, MCB, COMFET, GEMFET, or belonging to the MOS type, bipolar transistor with isolated trigger.

One of the advantages of these components resides in the ability which each has of being able to interrupt the passage of the current which flows through them when an appropriate control signal is applied to their trigger, respectively their gate, or respectively their base, and without it being necessary for the intensity of the current which flows through them at that time to be zero. This requirement appears, on the other hand, if the static switches belonged to the family of thyristors which will therefore be excluded from the present invention.

Reference 5 here relates to an electronic module whose function is to apply to the control electrode 6 of the static switch 3 one or more enabling $S_8$ or disabling $\overline{S_8}$ control signals so as to make it conducting or non-conducting.

This electronic module 5 is itself activated either by the appearance of a normal control signal S or $\overline{S}$ for bringing into or out of service, or by that of a fault signal $S_1$ which is delivered by a current measuring device 7 associated with the through circuit 16 when this current assumes values considered dangerous for the load or for the lines RST.

A voltage limiting component such as a varistor 8 comprising, for example, a metal oxide such as ZnO is connected in parallel across the static switch 3.

Another output signal $S_5$, delivered without delay by the electronic module 5 is applied to an associated circuit 9 whose function is to cause, by a channel $S_9$ other than the usual manual or automatic channel, the breaking of a limiting breaker 10 containing switch 2.

It is known that a traditional limiting breaker apparatus uses a current detection system, usually comprising, in series with the switch, bimetallic strips and coils whose energization by intense currents causes the attraction of a magnetizable plate or core, the deflections of the bimetallic strips and/or the movements of the magnetizable parts being used for instantaneous tripping of a set mechanism and the very rapid breaking of the switch whose mobile contact is associated therewith.

The limiting breaker type apparatus 10 which is used in the circuit of the invention does not necessarily comprise the above-mentioned detection members to the extent that detection of the level or of the growth of the intensity of the current may be provided by probe 7 and processed by the electronic module 5.

On the other hand, apparatus 10 comprises the set of mechanical means 15 required for causing rapid opening of the switch which is capable of limiting intense currents; to this end, this apparatus may make use of one or more of the prior known measures such as those using the energy accumulated in a spring, or the electrodynamic repulsion forces developed by the combination of fields and currents, or those which cause strangling of the arcs using isolating screens introduced between the fixed and mobile contacts as soon as they separate.

Apparatus 10 further comprises a special tripping coil 11, which is fed directly or indirectly as soon as signal $S_9$ appears so as to attract a core or a plate 12. The latter may either cause tripping of the set mechanism alone or else beforehand strike the mobile contact 2 *m* so as to accelerate the opening thereof in a way known per se.

Depending on whether this apparatus is constructed to be reset manually or, on the contrary, electrically by remote control, a manual reset button 13 and/or respectively an auxiliary device 14 may be associated therewith; in the latter case, the appearance of a make signal S will condition, for example, the energization of an electromagnet housed in device 14 if switch 2 is open. The operation of this circuit, which is naturally the same if the elements forming it are all grouped together in the same apparatus 20 (surrounded by a dotted line), or are, on the contrary, separated into separate units *5a* respectively 10, when an appropriate breaker type apparatus is available separately, must comply with a particular sequence of operations, respectively of signals.

Figure 7:
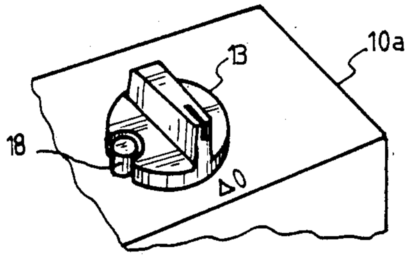
FIG. 7, a detail of construction of a mechanical device for providing adequate timing of the closure orders applied to the two switches, during manual control for bringing into service the first time or for resetting.

When it is desired to apply power to the circuit or apparatus for the first time, or apply power again after a break when switch 2 is open and when switch 3 is disabled, the latter will be prepared to be conducting before switch 2 is closed: for this, first of all, either a manual closure, opening and reset member, for example rotary such as 13 belonging to the breaker apparatus 10, is brought into a previous position causing emission of a signal S, or this signal S is caused to appear by means of a remote control channel which signal will in both cases be communicated without delay to the electronic modules. The delayed control of the electromechanical switch 2, which will therefore only be established after the appearance of the enabling signals $S_8$ at switch 3, respectively after the appearance of signal S, could for example also result from the previous actuation of a push-button 18 for transmitting the signal S, see also FIG. 7, while allowing, once pressed, control of the manual reset member 13.

This timing, which results from the fact that the reset and protective break function is provided by the limiting breaker 10 must not be used by the manual rotary member 13 when it is desired to cause normal and repeated switching on and off of the load, and therefore indicates that the signal S is only transmitted by the push-button 18 or respectively the rotary knob 13, this signal S being processed by other channels so as to then control the enabled and disabled conditions of the static switches controlling the operation of the load.

When an overload appears in line 16 and/or in one of the corresponding lines when the network is multiphase, the fault signal $S_1$ delivered by the detector or probe 7 is processed by the electronic module 5 which then delivers disabling signals $\overline{S_8}$ for the static switches 3.

A signal $S_5$ causing the substantially synchronous appearance of signals $S_8$ is applied to the associated circuit 9 which in its turn delivers a current signal $S_9$ for energizing the electromagnet 17; the plate 12 thereof then causes rapid opening of switch 2, either by tripping mechanism 15 alone, or by a simultaneous action on the mobile contact *2m*.

Figure 2:
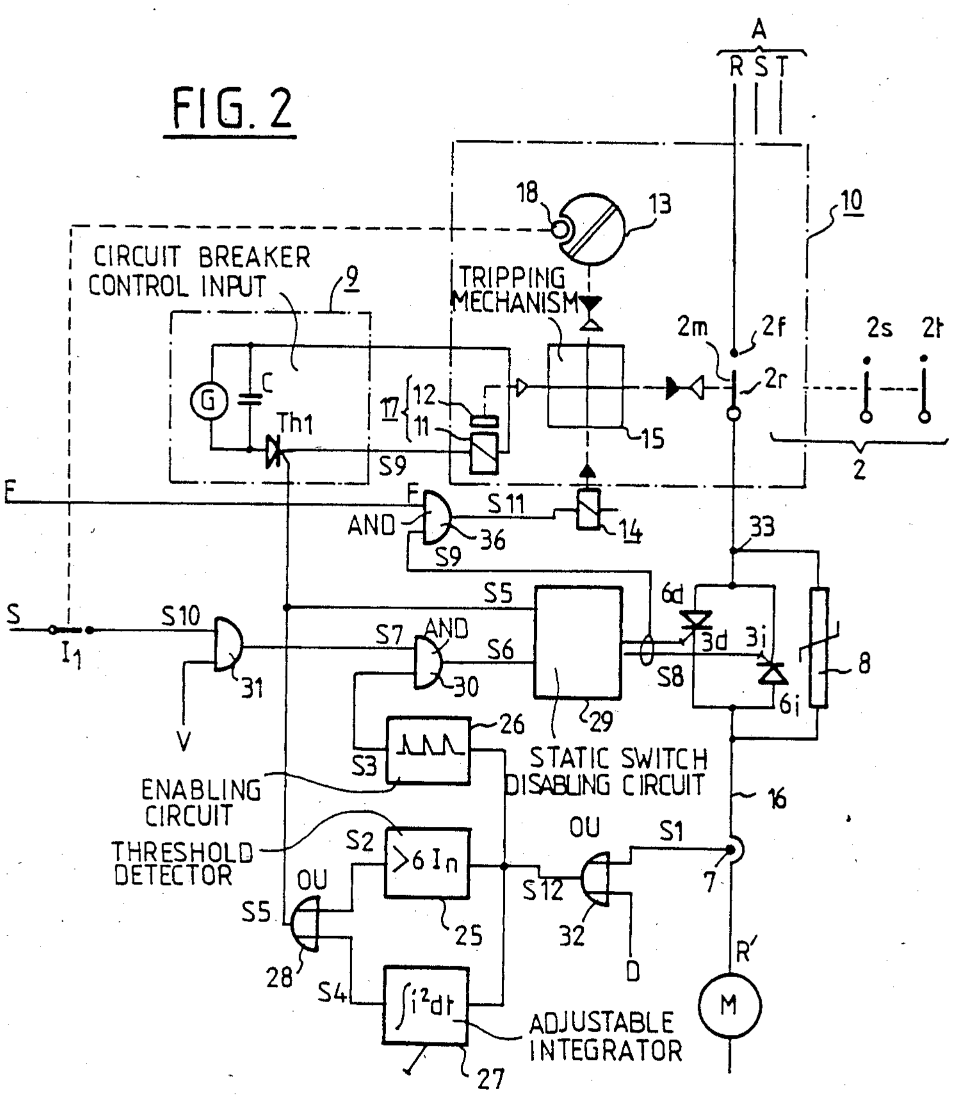
FIG. 2, a more detailed diagram of a circuit such as shown in FIG. 1, in which the threshold is 470 V.

Complementary details relative to the construction of the electronic module and respectively the construction of the limiting breaker show, in FIG. 2, the operation of the circuit; the latter being provided here for using static switches *3d, 3i* anti-parallel mounted and protected by a voltage limiting component 8 having an appropriate threshold voltage.

The level of this threshold is chosen, on the one hand, by taking into account the operating conditions required by the installation (depending on whether the latter will require frequent making and breaking of the circuit under a nominal load or not and depending on the nature of the overload) and, on the other hand, as a function of the properties which the available voltage limiters will have for discharging, between two successive operating cycles, the thermal energy which they will have stored during the passage of a fault current flowing whenever a voltage appears at their terminals higher than their stabilization threshold. By way of example, a 220 V network feeding an inductive load would require the use of a stabilizer whose threshold would be between 200 V and 500 V.

In this circuit, where the members and signals corresponding to those in FIG. 1 are designated by the same references, the signal $S_1$ is applied through the analog OR gate 32 to a threshold detector circuit 25 receiving signal $S_{12}$ and delivering a signal $S_2$ when the current measured by probe 7 is for example greater than about six times the nominal current $I_n$, a value which is currently observed during difficult motor start-ups; this signal $S_{12}$ is also applied to an enabling circuit 26 which delivers pulses $S_3$ for enabling an AND gate 30 whenever the current flowing through the through line 16 takes on a zero value.

Since the breaker apparatus 10 does not necessarily comprise bimetallic strips capable of detecting thermal overloads, an adjustable integrator circuit 27 will be fed by signals ${}_{12}$ so as to emit signals $S_4$ when a dangerous energy $\int i^2\,dt$ has been absorbed by the load.

A signal $S_5$ which is emitted by an OR gate 28 whose inputs receive the signals $S_2$, $S_4$, is applied to the control electrode of a thyristor Th1 whose anode-cathode junction is placed in series with the coil 11 of a small electromagnet 17 having a plate or core 12 which serves as trip for releasing the set mechanism 15; the series connection of the two members Th1, 11 is moreover fed by a capacitor C whose rapid charge is provided by a generator G; the latter may be formed by an external source or by a source supplied locally upstream of the apparatus 10.

The appearance of a signal $S_5$ causes thyristor Th1 to conduct and the capacitor to discharge through coil 11 for tripping the mechanism 15 and opening switch 2 of the breaker. This opening will however only take place with a response time which is longer than that required for disabling the static switches, this signal $S_5$ also being fed to a control circuit 29 which instantaneously delivers the disabling signals $S_8$ to electrodes *6i*, *6d* of the static switches *3i*, *3d*, when a current fault appears. This same circuit 29 also generates the signals $S_8$ required for causing conduction.

The control circuit 29 may be further activated by signals $S_6$, $S_6$, which are only delivered when, with switch 2 closed, it is necessary to supply load M or to interrupt this supply so that normal operation takes place.

These signals $S_6$ and $S_6$ are delivered by an AND gate 30, one input of which is represented by the enabling signals $S_3$ whereas the second input receives signals $S_7$ delivered for example by a gate 31. The latter may be enabled by two signal channels V or $S_{10}$ both using the existence of the same enabling or disabling signal S or S.

As was mentioned above, the emission of a signal $S_8$ causing the conducting state of the static switches must precede closure of switch 2.

Signal $S_{10}$ consequently can only reach gate 31 if an auxiliary switch $I_1$ which is coupled to the breaker 10 for receiving either the movement of the mobile contact *2m* or the state of mechanism 15, is closed, when switch 2 is open.

If a push-button 18 is used as was mentioned above in connection with FIG. 7, it will first of all provide manual closure of switch $I_1$ and knob 13 which then holds it in the closed state will have to assume, after breaking, a position O corresponding to opening, and in which switch $I_1$ will be open.

If a remote reset means 14 is used acting directly on mechanism 15, through an internal operation, or indirectly on knob 13 also serving for resetting, the transmission of a remote pulsed reset signal F will have to be conditioned by the prior existence of the preparation of static switches 3 for conducting; this condition may for example be checked by means of an AND gate 36, whose output delivers the signal $S_{11}$ and whose two inputs receive respectively this signal $S_9$ which is present at the same time as $S_8$.

Figure 3:
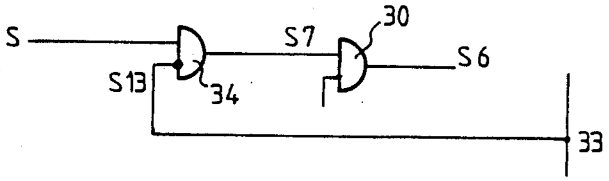
FIG. 3, a diagram of a circuit variant of FIG. 2.

The open state of switch 2 may also be taken directly at a point 32 of the through circuit 16 which is then without voltage, and be applied with a suitable reversed sign $S_{13}$ to an AND gate 34 also receiving the signal S, see FIG. 3.

In this case, the circuit must be prevented from resetting itself as soon as the voltage at point 33 disappears following breaking of switch 2 on a fault, This condition is verified if, as mentioned above, the signal F is present in the form of a pulse offset in time with respect to the appearance of signal S.

Figure 4:
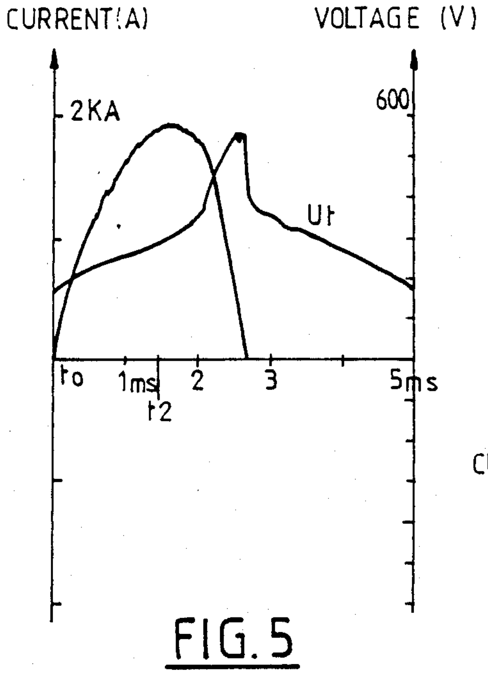
FIGS. 4, 5 and 6, measurement readings of currents and voltages observed in the circuit and respectively at the terminals of the switches when a short-circuit current appears assumed to be 25 KA effective in a network supplying a load, at 254 V, whose cos $\phi$ is 0.1.

The voltage $U_t$ taken at terminals RR′ of a phase line 16, and that of the current, see FIG. 4, shows the development of a current half wave appearing when a short-circuit appears, and shows not only the very rapid decay slope thereof, but also the very short passage time of the overcurrent limited here to 2 KA peak at time $t_2$; the effective current would have reached 25 KA at 254 V and the threshold voltage of the voltage limiter used was here chosen at about 200 V.

The total voltage taken between terminals RR′ reveals the existence of an initial voltage of about 180 V at time $t_o$, and a peak voltage reached of about 600 V, which explains the very rapid decay of the current.

Figure 5:
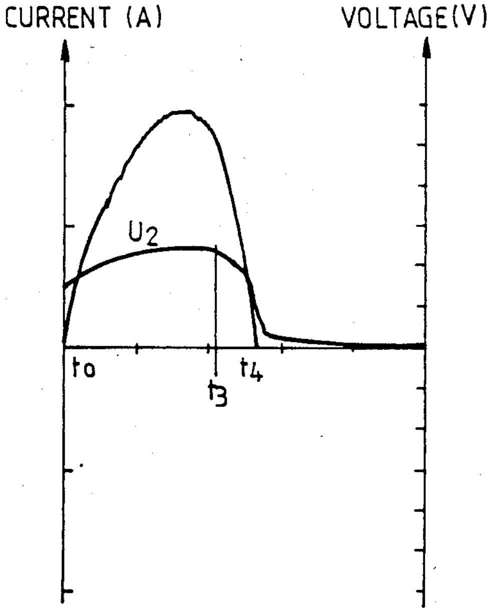

It will be noted in FIG. 5, where the voltage $U_2$ is shown developed at the terminals of the static switches and of the voltage limiter, that the total initial voltage at time $t_o$ is only developed at this level and that, since its development does not exceed 250 V, the choice of low voltage semiconductors is perfectly justified.

Figure 6:
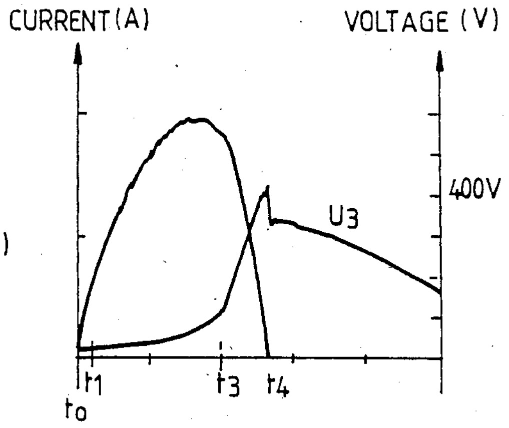

Time $t_3$ which marks the maximum of the voltage $U_2$ corresponding substantially to the time when the arc voltage $U_3$ developed at the terminals of the limiting breaker 2 begins a much faster growth than that usually observed during the rapid opening of a switch, the latter taking place at time $t_1$ following closely on time $t_o$, see FIG. 6.

This time $t_3$ corresponds in fact to that when strangling of the initial arc takes place, such strangling being here caused by the introduction of an isolating screen between the fixed *2f* and mobile *2m* contacts of the limiting apparatus used which brings the arc voltage to a value greater than 400 V.

Signals such as V and D which are not attached to emission devices shown in detail in FIG. 2 may be applied, one V to an AND gate 31 so as to allow if required the transmission of signal S in conjunction with the presence of a subsidiary signal, for example a safety signal related to the closure of a box, and the other D to an analog OR gate 32 for simulating for example the presence of a current fault and checking the operation of the circuit or of the apparatus.

Considering the breaking function which may be provided by switch 2 respectively apparatus 10, the latter will preferably be disposed at the head of the line.

The construction of the assembly may use an apparatus 10 whose case contains the members shown in a box in FIG. 2; according to the particular embodiment shown in this figure, a single electromagnet 17 is used for tripping the mechanism 15 so as to provide simultaneous opening of each of the limiting switches 2 associated respectively with each line R,S,T.

An opening control electromagnet may also be associated with each switch such as 2 for causing, each one, tripping of the common mechanism 15 and rapid introduction of an isolating screen between the fixed and mobile contacts which have just separated, so as to improve the limiting power; in the latter case, the coils of these electromagnets may be connected in series or in parallel.

Finally, when three electromagnets are available such as 17, each associated with a line switch section *2r*, *2s*, *2t* and each capable of tripping mechanism 15, two of them may be used for automatic breaking purposes in the case of an overload and the third for providing external remote controlled breaking.

Such remote controlled breaking which must take place when the static switches 3 are disabled implies then that the latter receive corresponding signals beforehand.

What is claimed is:

1. An apparatus for supplying a load from an AC-power source through a serial circuit comprising the serial connection of electromechanical switch means having electromechanical control means and static switch means having control electrodes, said apparatus further comprising means for measuring the current flowing through the serial circuit and generating at each occurence of a current overload disabling signals respectively applied to said electromechanical control means and to said control electrodes, wherein:

said electromechanical switch means has current limiting properties;

said static switch means includes at least one low voltage controlled semi-conductor component of the IGBT type and a voltage limiting component connected in parallel across said semi-conductor component;

the time delay elapsed between an occurence of a current overload and the opening of said electromechanical switch means is substantially shorter than the duration of a half-wave of the overload current.

2. An apparatus as claimed in claim 1, wherein said electromechanical static switch means comprises two semi-conductor components of the same type connected in anti-parallel whereas said electromechanical control means comprise an electro-magnet and auxiliary supply means for said electromagnet, said auxiliary supplying means having a response time shorter than said time delay.

3. An apparatus as claimed in claim 2, wherein said switch means has a quick tripping mechanism and manual control means for setting and resetting said quick tripping mechanism, said manual control means, when actuated, causing the emission of enabling signals for causing conduction of said static switch means before said electromechanical switch means is closed.

4. An apparatus as claimed in claim 2, wherein said electromechanical switch means has a quick tripping mechanism and manual control means and said apparatus further comprises circuit means for generating enabling signals for causing conduction of said static switch means, and pusher means cooperating with said manual control means and with said circuit means for preventing actuation of said manual control means until said conduction is established.

5. An apparatus as claimed in claim 2, wherein said electromechanical switch means has a quick tripping mechanism and a remote control reset device cooperating with said tripping mechanism, said apparatus further comprising an AND gate having first and second inputs, said first input receiving a reset signal and said second input receiving a further signal at the time when enabling signals causing conduction of the static switch means are produced, said AND gate having an output connected to said remote control reset device.

6. An apparatus as claimed in claim 2, wherein said electromagnet has a coil and auxiliary supply means comprising a capacitor and a further semi-conductor component are connected in series with said coil.

7. An apparatus as claimed in claim 6, wherein said further semi-conductor component has a control electrode and said apparatus further comprises an OR gate having an output connected to said control electrode and first and second inputs, a current threshold detector and an integrator circuit being respectively connected to said first and second inputs and supplied with a current measurement signal which is delivered by said means for measuring the current.

8. An apparatus as claimed in claim 7 and further comprising further circuit means, supplied from said means for measuring the current, for delivering control signals enabling conduction of the static switch means to take place for a zero value of the current flowing through said serial circuit.

* * * * *